(12) United States Patent
Dortschy et al.

(10) Patent No.: US 12,213,087 B2
(45) Date of Patent: Jan. 28, 2025

(54) IAB DOWNLINK TIMING

(71) Applicant: Telefonaktiebolaget LM Ericsson (publ), Stockholm (SE)

(72) Inventors: Boris Dortschy, Hägersten (SE); Robert Baldemair, Solna (SE); Per-Erik Eriksson, Stockholm (SE); Yezi Huang, Täby (SE); Erik Dahlman, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 526 days.

(21) Appl. No.: 17/290,254

(22) PCT Filed: Jan. 29, 2019

(86) PCT No.: PCT/SE2019/050062
§ 371 (c)(1),
(2) Date: Apr. 29, 2021

(87) PCT Pub. No.: WO2020/091638
PCT Pub. Date: May 7, 2020

(65) Prior Publication Data
US 2021/0377885 A1 Dec. 2, 2021

(30) Foreign Application Priority Data
Nov. 2, 2018 (SE) .................................. 1800213-9

(51) Int. Cl.
*H04W 88/14* (2009.01)
*H04W 56/00* (2009.01)

(52) U.S. Cl.
CPC ....... *H04W 56/001* (2013.01); *H04W 56/004* (2013.01); *H04W 88/14* (2013.01)

(58) Field of Classification Search
CPC .... H04W 56/004; H04W 88/14; H04W 56/00
(Continued)

(56) References Cited

U.S. PATENT DOCUMENTS 5,363,375 A * 11/1994 Chuang ................. H04J 3/0679
370/332
2013/0039195 A1 * 2/2013 Weng .................... H04W 48/20
370/252

(Continued)

OTHER PUBLICATIONS

AT&T, "Enhancements to support NR backhaul links", 3GPP TSG RAN WG1 Meeting #94bis, R1-1810690, Chengdu, China, Oct. 8-12, 2018, pp. 1-15.

(Continued)

*Primary Examiner* — Dang T Ton
(74) *Attorney, Agent, or Firm* — Murphy, Bilak & Homiller, PLLC

(57) ABSTRACT

There is disclosed a method of operating an Integrated Access and Backhaul (IAB) node (200, C, N3) in a radio access network, the IAB node (200, C, N3) being connected to a first parent IAB node (200, N1, P) via a first backhaul link having a first timing, and being connected to a second parent IAB node (200, N2, P) via a second backhaul link having a second timing, the IAB node (200, C, N3) providing a communication link for access or backhaul, the communication link having a communication timing based on the first timing and the second timing. The disclosure also pertains to related methods and devices.

14 Claims, 9 Drawing Sheets

(58) Field of Classification Search
USPC .......................... 370/329, 400, 401, 402, 403
See application file for complete search history.

(56) References Cited

U.S. PATENT DOCUMENTS

| | | | |
|---|---|---|---|
| 2018/0097541 A1* | 4/2018 | Bhattad | H04L 5/0091 |
| 2022/0053433 A1* | 2/2022 | Abedini | H04W 16/28 |
| 2023/0043337 A1* | 2/2023 | Huang | H04L 5/005 |

OTHER PUBLICATIONS

CATT, "NR Physical Layer design for IAB backhaul link", 3GPP TSG RAN WG1 Meeting #94bis, R1-1810538, Chengdu, China, Oct. 8-12, 2018, pp. 1-7.

Cewit, "On IAB timing alignment", 3GPP TSG RAN WG1 Meeting #94bis, R1-1811554, Chengdu, China, Oct. 8-12, 2018, pp. 1-7.

* cited by examiner

IAB DOWNLINK TIMING

TECHNICAL FIELD

This disclosure pertains to wireless communication technology, in particular in the context radio access technologies.

BACKGROUND

For radio access networks, radio nodes are connected to a core network, to allow communication between terminals in different cells provided by different radio nodes. The radio nodes are usually connected to the core network by wire or cable, in particular via optical fibre. However, it is not always practical or feasible to arranged such a land-bound connection. For such cases, there may be employed relay nodes or nodes for integrated access and backhail (IAB). An IAB node may on the one hand provide radio access to terminals or user equipments (UEs), and on the other hand may communicated to a parent (IAB) node via radio technology, to be relayed or routed to a core network, e.g. via a donor node. Due to sharing time/frequency resources with terminals and other nodes, the use of IAB nodes requires new approaches of managing resources and node behaviour.

SUMMARY

It is an object of the present disclosure to provide approaches facilitating improved IAB handling.

The approaches are particularly advantageously implemented in a 5$^{th}$ Generation (5G) telecommunication network or 5G radio access technology or network (RAT/RAN), in particular according to 3GPP (3$^{rd}$ Generation Partnership Project, a standardisation organization). A suitable RAN may in particular be a RAN according to NR, for example release 15 or later, or LTE Evolution.

There is disclose a method of operating an Integrated Access and Backhaul (IAB) node in a radio access network. The IAB node is connected to a first parent IAB node via a first backhaul link having a first timing, and being connected to a second parent IAB node (200, N2, P) via a second backhaul link having a second timing, the IAB node (200, C, N3) providing a communication link for access or backhaul, the communication link having a communication timing based on the first timing and the second timing.

There is also disclosed a network node for a radio access network, the network node being an Integrated Access and Backhaul (IAB) node. The IAB node is adapted to be connected or connectable to a first parent IAB node via a first backhaul link having a first timing, and being connected or connectable to a second parent IAB node via a second backhaul link having a second timing. The IAB node is adapted for providing a communication link for access or backhaul, the communication link having a communication timing based on the first timing and the second timing. The IAB node may comprise, and/or be adapted for utilising, processing circuitry and/or radio circuitry, in particular a transceiver and/or receiver and/or transmitter, for providing the communication link and/or for operating on the first backhaul link and/or the second backhaul link.

The first and second backhaul links may be in a set of parent backhaul links to a number of parent node larger than two. Any link-specific parameter mentioned may pertain to one of the link provides by a parent of the set. A backhaul link from a parent IAB node (also referred to as parent node) may be controlled regarding timing and/or synchronisation by the parent, e.g. via DCI signaling and/or SS/PBCH block signaling, in particular with signaling indicating timing advance and/or timing advance adjustment, and/or primary and/or secondary synchronisation signaling. Alternatively, or additionally, the backhaul link may be power-controlled by the parent node, e.g. via TPC commands in DCI. In general, the parent node may control physical layer aspect of communication with a child node (the IAB node) with suitable control signaling, e.g. DCI signaling. A backhaul link may generally be a wireless connection between network nodes (IAB nodes), over which signaling from a (wireless or radio) access link or another backhaul link may be carried or transported or routed, e.g. to another IAB node. In particular, signaling between a terminal not in direct radio access with a donor node may be carried over one or more backhaul links. The backhaul links may be in mm-wave ranges. It may be considered that backhaul link and access links are in different frequency ranges and/or carriers. For example, access links may be lower in frequency, e.g. below 6 GHz. Backhaul links may share a frequency range and/or carrier and/or carrier aggregation.

Providing a communication link may comprise providing a cell and/or uplink and/or downlink communication for the link, e.g. for access and/or backhaul. The IAB node may provide power control and/or timing and/or synchronisation for a child (e.g., terminal or IAB child node) on the communication link it provides, e.g. analogously to the approaches described above. Providing a communication link may comprise transmitting and/or receiving signaling on the link, based on the communication timing. The timing for transmission and reception on the communication may be linked, e.g. based on distance to the communication partner and/or timing advance or timing advance adjustment for the communication partner (e.g., a terminal, if it is an access link, and an IAB node if it is a backhaul link). In general, the communication timing may be used for multiple communication links provided by the IAB node, e.g. an access link and/or one or more backhaul links. An access link may pertain to a cell, or more than one cell, provided by the IAB node, which may allow radio access for a plurality of terminals. A backhaul link may be device-specific, e.g. with strong beamforming to a stationary child node.

It may be considered that the timing of transmission by the IAB node on the communication link may be based on the communication timing. The transmission timing may be specific to the IAB node, not dependent on child devices like terminals or IAB child nodes. In some cases, the transmission timing may also determine the reception timing, e.g. device-specific.

In some variants, the timing of reception by the IAB node on the communication link is based on the communication timing. The reception timing may depend on the transmission timing of the transmitter, e.g. a child device like a terminal or IAB child node. This transmission timing may be controlled by the IAB node based on the communication timing, e.g. based on control signaling, which may indicate timing advance and/or advance adjustment, and/or based on synchronisation signaling like SS/PBCH block signaling, which may define the basic synchronisation of a timing grid used for the communication link.

The communication timing may be based on a function of the first timing and the second timing, and/or in a function of parent timings. The function may be based on a sum or weighted sum, e.g. weighted for each link and/or parent.

The first timing may be based on control signaling indicating timing and/or synchronisation received from the first parent node, e.g. indicating timing advance and/or timing advance adjustment, for the first backhaul link, and/or the second timing may be based on control signaling indicating timing and/or synchronisation received from the second parent node, e.g. indicating timing advance and/or timing advance adjustment, for the second backhaul link. Other parent timing may be provided similarly. Parent timing may generally indicate one or more aspects of timing associated to communication on the associated backhaul link, e.g. timing advance and/or timing advance adjustment, and/or reception timing and/or transmission timing of the parent node, and/or reception timing and/or transmission timing of the IAB node (child node) for this backhaul link, and/or synchronisation provided by the parent node.

The communication timing may be based on a timing synchronised relative to a donor node. A donor node may generally be an IAB node with higher-layer control functionality, and/or an IAB node with a cable connection to a core network, e.g. via fibre or wire. The donor node may provide synchronisation via synchronisation signaling, e.g. SS/PBCH block signaling, synchronising its child nodes, which then provide similar synchronisation to their child nodes, etc. Each synchronisation step may be based on the parent synchronisation, such that in general, the whole IAB arrangement connected to one donor may be similarly synchronised. It should be noted that individual transmission and reception timing may be based on the synchronisation, but may be shifted, e.g. due to delay and/or signal travel time effects, which may be accommodated for e.g. via timing advance and/or timing advance adjustment functionality. Also, the synchronisation may be considered to pertain to the physical layer, e.g. in regard to the timing grid used. When specific signaling is transmitted on this grid may be determined on a higher layer, e.g. by a scheduler and/or the MAC or higher layer.

The communication timing may in particular be based on a weighted sum over the first timing and the second timing. This allows considered different characteristics of links.

The communication timing may be based on received power and/or signal quality, for example one or a combination of SIR, SNR, SINR, BER or BLER or energy or power per resource element or similar parameters of signal quality. The signal quality may be determined by the IAB node, e.g. based on measurements, in particular based on measurement of reference signaling on the backhaul links.

The IAB node may be connected, or adapted to be connected or connectable, to a plurality N of parent nodes via associated backhaul links with corresponding timings. Thus, complex IAB node arrangement with high levels of redundancy and/or high data throughput may be provided.

The communication timing may in general be based on the number of parent nodes of the IAB node, and/or hop-count of a parent. The hop-number may indicate the number of backhaul links signaling has to go over from a terminal on an access link of the IAB node to the donor. Links with lower hop-count may be weighed higher than links with higher hop-count. For example, a weight may be dependent on 1/HC, with HC the hop-count of a link or associated to a parent. It should generally be considered that each parent may be associated to one backhaul link to the IAB node.

The communication timing may be based on link latency and/or propagation delay, e.g. for each link. Lower latency and/or propagation delay may be weighted higher than higher latency and/or delay. The latency and/or delay may be measured during operation, e.g. by the IAB node, and/or may be provided by another node, in particular a parent node.

It may be considered that the communication timing is based on historical information and/or numerology, e.g. relative to the numerology used by the donor node and/or communication link provided by the IAB, for example if it is an access link. Historical information may provide information regarding operational conditions over time, e.g. regarding data throughput and/or variation of signal quality or received power and/or activity on access links. Such information may be stored in a memory of the IAB node, and/or be provided by higher-layer functionality, e.g. from the network, in particular a donor node or management function, e.g. a MME.

In general, parameters on which the communication timing may be based on may pertain to each parent or backhaul link provided by a parent. It may be considered that a weight for a link is based on one or more parameters, and/or a different functional correspondence may be considered. For example, a parabolic function instead of a weighted sum may be used. A sum with all weights being 1, or being equal, may be considered a weighted sum. However, in at least some variants, different links may be weighted differently, e.g. by assigning different weights. It may be considered that the communication timing is based on a multi-weight sum, e.g. one sum over multiple different functions dependent on time, which may have associated different weights to them, for example in the form of $a(k)*f1+b(k)*f2+c(k)*f3$, wherein a, b and c represent weight functions per link, e.g. based on different parameters, and f1, f2 and f3 represent different functions depending on parent timing. The different functions may be dependent of different aspects of parent timing, e.g. reception timing and/or transmission timing and/or timing advance and/or timing advance adjustment. $B(k)$ and/or $c(k)$ may be zero. It may in general be considered that the dependence of the communication timing on parent timings is configured or configurable, e.g. via higher layer signaling from a donor node. Such signaling may in general be transmitted to the IAB node via a backhaul link. For example, values of the weights to be used may be configured.

A program product comprising instructions adapted for causing processing circuitry to control and/or perform any method described herein may be considered. Also, there is described a carrier medium arrangement carrying and/or storing such a program product.

The approaches described herein allow use of a downlink timing considering influence from multiple parents, which is particularly suitable for a multi-parent IAB arrangement. In particular, the timing accommodates for different operational conditions on different links with different parents, and provides a stable environment, even if communication is relayed or routed over different links or paths at different times.

In the context of this disclosure, a backhaul link to a parent may be referred to as UL backhaul link, a backhaul link to a child may be referred to as DL backhaul link. For each backhaul link, there may be communication in both directions, from parent to child and reverse. Communication on a backhaul from child to parent may be considered UL communication, or UL component of the backhaul link, and from parent to child may be considered DL communication, or DL component of the backhaul link. Thus, for an IAB node with an UL backhaul link, UL communication 215 goes from the IAB node to a parent node, and DL communication from parent to the IAB node, for this backhaul link. For a DL backhaul link, UL communication would go from the child to the IAB node, and DL communication from the IAB node to the child., for the backhaul link. An analogous terminology may be used for an access link, providing radio access to terminals.

BRIEF DESCRIPTION OF THE DRAWINGS

The drawings are provided to illustrate concepts and approaches described herein, and are not intended to limit their scope. The drawings comprise.

DETAILED DESCRIPTION

In the following, variants are described in the context of NR, however, the approaches may be implemented in different contexts.

Figure 1:
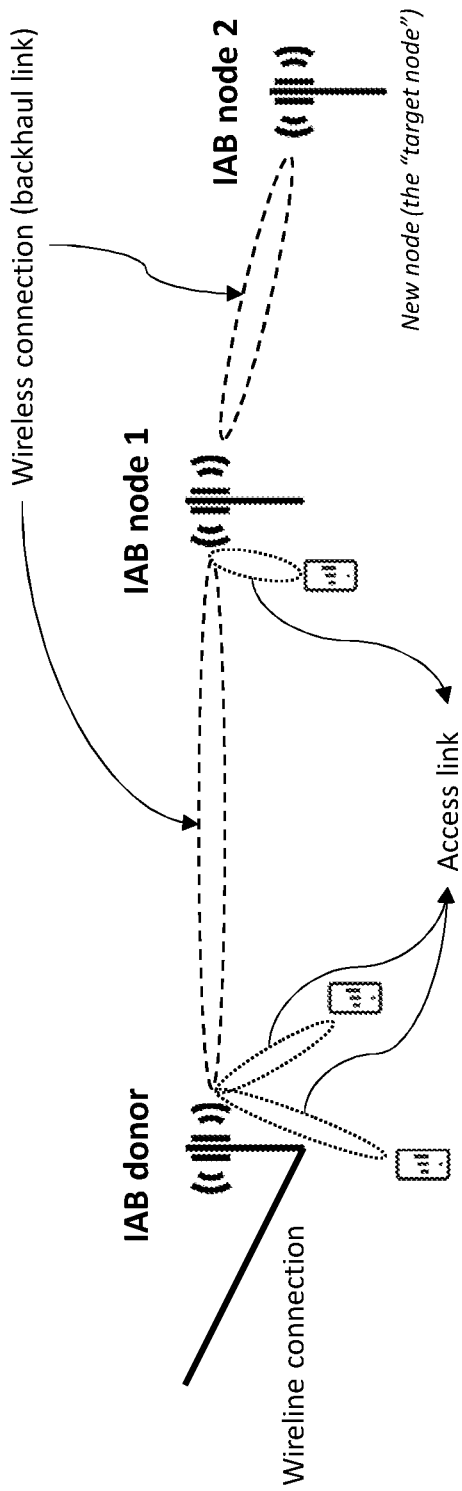
FIG. 1, showing an exemplary IAB arrangement.

FIG. 1 shows an exemplary setup of a backhaul arrangement. An IAB donor node (also referred to as donor) may be connected to a core network via a wireline connection (cable or fibre, e.g.). It provides radio access for terminals, and a wireless connection to another network node, an IAB node 1. The IAB node 1 also provides radio access for terminals (via an access link), and communicates to the donor via a wireless connection providing a backhaul link. Moreover, it provides a backhaul link to an IAB node 2. FIG. 1 thus shows a multi-hop arrangement, wherein communication via IAB node 2 passes via two backhaul links until it reaches the IAB donor. In general, an IAB node may be any node that is adapted for providing radio access to one or more terminals/UEs (via access links), and also may access and/or provide one or more backhaul links. A backhaul link may generally be provided to route and/or forward communication from or to a terminal to another IAB node, e.g. using radio signaling. Backhaul and access links may in general use the same or different resource structures. In particular, they may operate on the same carriers and/or carrier aggregations. The carriers used may in particular be mm-wave carriers, e.g. above 6 GHz or 20 GHz or 30 GHz in frequency. For each IAB node, each backhaul link terminated at an IAB node to be used to reach a donor may be counted as one hop. For example, an IAB node connected to a donor directly with a backhaul link would have a hop-count of 1, IAB node 2 in FIG. 1 has one of 2. For multiple-parent scenarios, different paths to a donor may have different hop-counts, or the same, depending on the arrangement.

Figure 2:
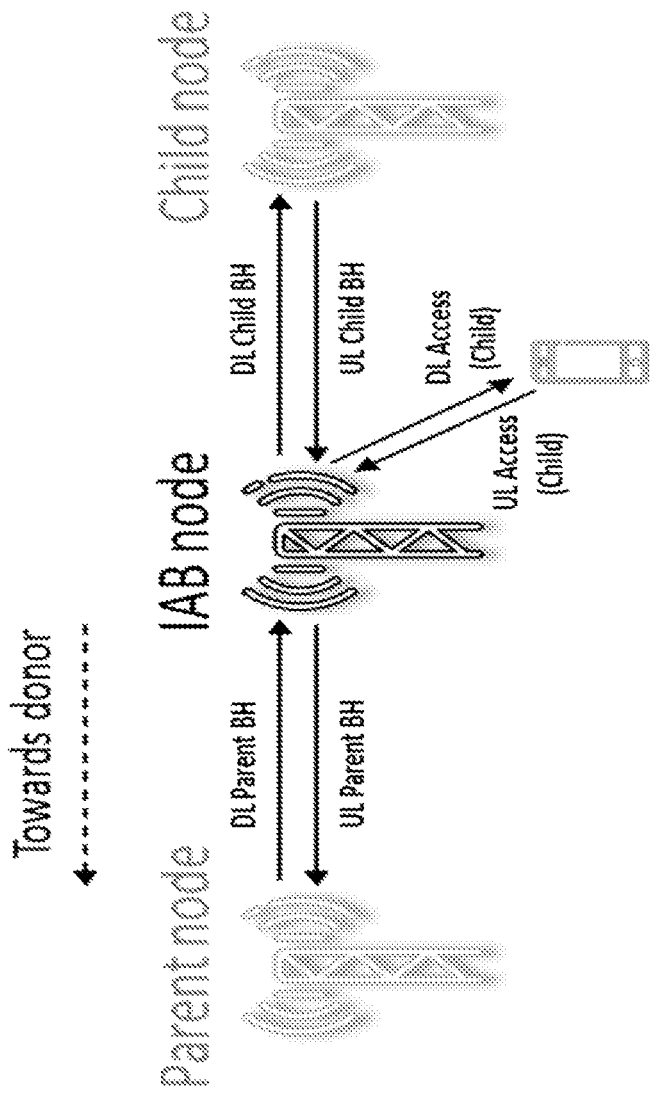
FIG. 2, showing another exemplary IAB arrangement.

FIG. 2 shows a different view of an IAB arrangement. From an IAB nodes point of view, it may be connected via a backhaul (BH) link to a parent node, which may be closer to the donor node (or be the donor node itself) in terms of backhaul links needed to reach the donor. Each backhaul link may comprise an UL component and DL component, which may for example be in TDD or FDD operation. In UL, communication may be transmitted in the direction of the donor. In DL, communication may be from the donor, e.g. to a terminal connected to the IAB node, or another IAB connected via another backhaul link. A device to which an IAB node provides radio access, either via an access link or backhaul link, may be considered a child node. An IAB node may in general process information received via an access link or backhaul link, e.g. to route its content to a target terminal or other IAB node or donor. It may be considered that an IAB node (e.g., as parent node) provides and determines control signaling on the access and/or backhaul links it provides. The control signaling may in particular be physical layer control signaling, e.g. DCI signaling, in particular for scheduling and/or power control and/or timing. Some IAB nodes, in particular a donor node, may be adapted to also provide higher-layer control, in particular RRC layer control.

In general, it may be assumed that an IAB node is aware of its children and parents (IAB children and parents). In particular, it may be aware of all IAB nodes reachable via a backhaul link it provides itself (e.g., children of children, or more distant children). It may be aware of higher-layer parents like grandparents, but in some cases not, as it may be adapted to follow control signaling by its direct parent. A parent of a parent may be considered a grandparent, a child of a child a grandchild, etc. A donor may be aware of all IAB nodes reachable via backhaul links provided by the donor, e.g. all children. This may be due to installation, or automatic communication between nodes when setting up.

Figure 3:
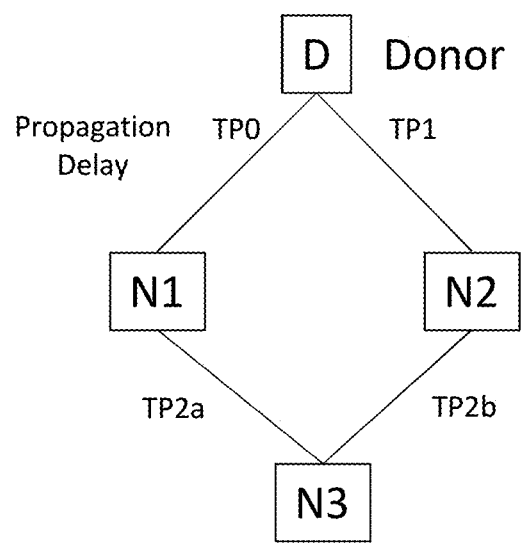
FIG. 3, showing a scenario with multiple IAB parents.

FIG. 3 shows another scenario for an IAB arrangement. A donor D is connected via backhaul links to two IAB nodes N1 and N2. D may be considered parent to N1 and N2. Another IAB node N3 may be connected to N1 and N2 via respective backhaul links, such that it may be considered to have multiple parents. It may be assumed that propagation delays of signaling differ between backhaul links, such that the delays TP0, TP1, and in particular TP2a and TP2b may be different. It should be noted that for a terminal connected to N3 via an access link, communication will suffer delay on at least two backhaul links (e.g., TP0 and TP2a or TP1 and TP2b). Delay on one link may also be caused by processing time needed by the IAB, if it processes signaling for forwarding or routing or relaying.

Figure 4:
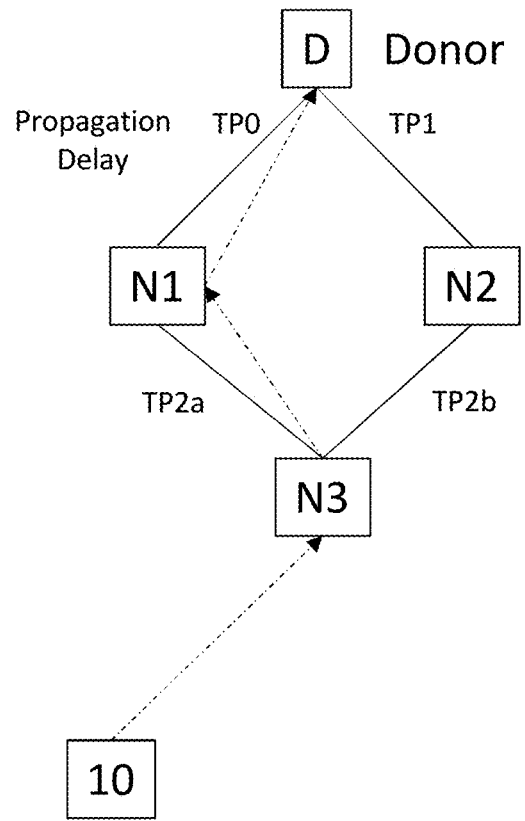
FIG. 4, showing a scenario with multiple IAB parents with one signaling path.

FIG. 4 shows an example in which communication from a terminal 10 is routed via one path running via N3 and N1. The communication between terminal 10 and IAB node N3 is via an access link, and then is routed via backhaul links between N3 and N1, and from N1 to D.

Figure 5:
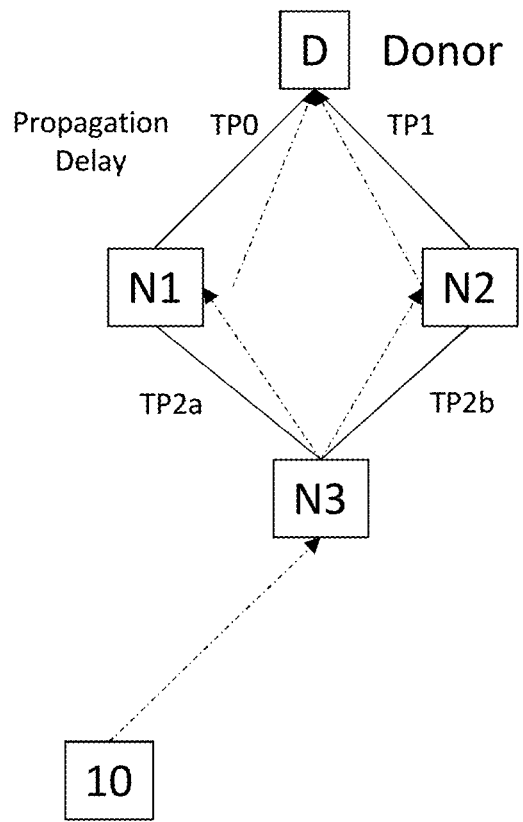
FIG. 5, showing a scenario with multiple IAB parents with two signaling paths.

FIG. 5 shows an example in which communication from a terminal 10 is routed via two paths, one running via N3, N1 and D, and one via N3, N2 and D. It should be noted that N3 is a child to both N1 and N2, and will receive physical layer control information from both parents N1, N2 independently, pertaining to each backhaul link is participates in as child. It should be noted that for a child with multiple parents, not all backhaul links have to be used for communicating data (e.g., carrying data from or for a terminal), but a backhaul link may be kept in reserve, e.g. established and/or maintained and/or set to sleep or idle, temporarily. However, it may be considered that signaling for a terminal, or for different terminals, is distributed over time between different backhauls. The use of multiple parents may provide improved reliability and/or a possible fallback. In some cases, different backhaul links may be used for different channels and/or communications and/or terminals based on reliability or quality requirements, and/or latency requirements and/or service agreements. A connection via a backhaul link may be in RRC idle and/or in DRX and/or may be upheld by regularly providing reference signaling and/or control signaling, even if no data signaling or signaling for or from a terminal is to be carried on the backhaul link.

Figure 6:
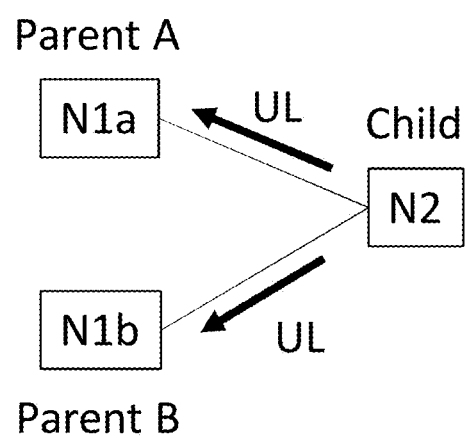
FIG. 6, showing UL control in a multiple IAB parent scenario.

FIG. 6 shows another view of a child N2 (which may be an IAB node) with multiple parents N1a and N1b. There may be considered scenarios with even more parents or changing parents. The UL communication from child N2 over the respective backhaul link to parent N1a and N1b will be controlled by the respective parent, e.g. in regard to timing and power control. In particular, each parent may provide the child with a timing advance and/or timing advance correction and/or synchronisation for adjusting timing for communication using the backhaul provided by the parent. Also, each parent may provide power control (e.g., in a closed loop with TPC commands) to adjust power within its backhaul link. The child generally has to adapt to this control, as otherwise the reception at the respective parent may be severely impacted, e.g. due to non-synchronised waveforms arriving, or the UL backhaul communication not being received or overshadowing other signaling (e.g., terminal in access links to the parent) due to transmission power being too low or too high. The timing and power control from different parents generally may be independent.

The downlink timing for the child node, the timing for its own backhaul link/s and/or access link/s, may in some variants not be directly controlled by the parent/s, e.g. due to its influencing reception of signaling at the parents not or to a lesser degree.

There may generally be assumed that a parent (P) node's DL transmit timing DLTx(p) is used as reference timing for a child's UL backhaul link (e.g., both for UL and DL components thereof). A child node (C) may receive the DL signal at DLRx(c)=DLTx(p)+Tprop, wherein Tprop is the propagation delay between parent P and child C. Node P signals a timing advance TA (and/or a TA adjustment information dTA) to node C to determine its uplink transmission timing ULTx(c) as DLRx(c)-(TA+dTA), such that ULRx(p) (time of reception of UL signaling transmitted by the child C in the UL backhaul) is received at ULRx(p)=DLTx(p)+TΔ. Node C may determine node P's DLTx(p) as DLTx(p)=DLRx(c)-(TA+dTA+TΔ)/2 (which should sum up to DLTx(p)=DLRx(c)-Tprop, assuming TA+dT=2Tprop-TΔ). Thus, the timing for the UL backhaul may be controlled by the parent.

In the following, DLRx(c,k), ULTx(c,k), TA(k), TΔ(k) may be set as DL Rx timing, UL Tx timing, actual timing advance (e.g., difference between DLRx(c,k) and ULTx(c, k)) and shift of ULRx(k) relative to DLTx(k) as measured or received over link k between parent k and a child (having parents k=1 . . . N). Assuming a node C has N parents, transmitting DL signals at DLTx, the node C may determine its DLTx(c) as $$DLTx(c) = \text{sum}\_(1\ldots N) a(k) * (DLRx(k) - (TA(k) + T\Delta(k))/2)$$
$$= \text{sum}\_(1\ldots N) a(k) * (DLRx(c, k) + ULTx(c, k) - T\Delta(k))/2$$

It may be considered sum_(1 . . . N) a(k)=1
a(k) may corresponds weights for different backlhaul links (UL backhauls links from the perspective of the child).
a(k) may be function of
  signal quality, e.g. SNR(k) (over link k from parent k to C); and/or
  received/receiving time DLRx(c,k), and/or the associated timing advance or timing advance adjustment; and/or
  the number of C's parents N; and/or
  the parents' hop-count (e.g. the #hops from parent (or child) to donor node); and/or
  latency on link k (e.g., total latency over the path, or latency just on the direct backhaul link); and/or
  propagation delay Tprop on link k, and/or
  based on history (e.g. throughput records); and/or
  received power on link k, and/or
    numerology on link k (which may be configured and/or configurable).

In some variants, a(k) could be configured by one or several parent nodes, or a network function, e.g. by the donor node.

In another variant, there may be considered $$DLTx(c) = \text{sum}\_(1\ldots N)(a(k)*DLRx(c,k) + b(k)*ULTx(c,k) - c(k)*T\Delta(k))/2$$

It may be considered sum_(1 . . . N) a(k)=sum_(1 . . . N) b(k)=sum_(1 . . . N) c(k)=1
  a(k), b(k), c(k) may be functions of
  signal quality, e.g. SNR(k) (over link k from parent k to C); and/or
  received/receiving time DLRx(c,k), and/or the associated timing advance or timing advance adjustment per link; and/or
  number of C's parents N; and/or
  parents' hop-count (e.g., the #hops from parent (or child) to donor node); and/or
  latency on link k and/or on the path/s using link k; and/or
  propagation delay Tprop on link k; and/or
  based on history (e.g. throughput records); and/or
  received power on link k; and/or
  numerology on link k.

In general, weights and/or a(k), and/or b(k) and/or c(k) if used, could be configured by one or several parent nodes, or a network function, e.g. by the donor node. Thus, the DL timing of an IAB may thus be IAB arrangement. It should be noted that a path may include all backhaul links to be used from an IAB node to reach a donor. In a multiple-parent scenario, there may be multiple paths for any given IAB node. The DL timing may generally be a timing applied by the IAB node to a backhaul and/or access link is provides, a DL backhaul link. The timing may pertain to the DL component and/or UL component of the backhaul link or access link. The UL component may be subject to timing advance and/or timing advance adjustment of the link, e.g. signaling by the IAB node providing the DL backhaul link.

Figure 7:
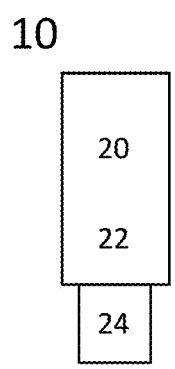
FIG. 7, showing an exemplary radio node implemented as terminal or UE.

FIG. 7 schematically shows a radio node, in particular a terminal or wireless device 10, which may in particular be implemented as a UE (User Equipment). Radio node 10 comprises processing circuitry (which may also be referred to as control circuitry) 20, which may comprise a controller connected to a memory. Any module of the radio node 10, e.g. a communicating module or determining module, may be implemented in and/or executable by, the processing circuitry 20, in particular as module in the controller. Radio node 10 also comprises radio circuitry 22 providing receiving and transmitting or transceiving functionality (e.g., one or more transmitters and/or receivers and/or transceivers), the radio circuitry 22 being connected or connectable to the processing circuitry. An antenna circuitry 24 of the radio node 10 is connected or connectable to the radio circuitry 22 to collect or send and/or amplify signals. Radio circuitry 22 and the processing circuitry 20 controlling it are configured for cellular communication with a network, e.g. a RAN as described herein, and/or for sidelink communication. Radio node 10 may generally be adapted to carry out any of the methods of operating a radio node like terminal or UE disclosed herein; in particular, it may comprise corresponding circuitry, e.g. processing circuitry, and/or modules.

Figure 8:
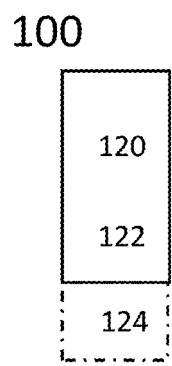
FIG. 8, showing an exemplary radio node implemented as network node.

FIG. 8 schematically show a radio node 100, which may in particular be implemented as a network node 100, for example an eNB or gNB or similar for NR. Radio node 100 comprises processing circuitry (which may also be referred to as control circuitry) 120, which may comprise a controller connected to a memory. Any module, e.g. transmitting module and/or receiving module and/or configuring module of the node 100 may be implemented in and/or executable by the processing circuitry 120. The processing circuitry 120 is connected to control radio circuitry 122 of the node 100, which provides receiver and transmitter and/or transceiver functionality (e.g., comprising one or more transmitters and/or receivers and/or transceivers). An antenna circuitry 124 may be connected or connectable to radio circuitry 122 for signal reception or transmittance and/or amplification. Node 100 may be adapted to carry out any of the methods for operating a radio node or network node disclosed herein; in particular, it may comprise corresponding circuitry, e.g. processing circuitry, and/or modules. The antenna circuitry 124 may be connected to and/or comprise an antenna array. The node 100, respectively its circuitry, may be adapted to perform any of the methods of operating a network node or a radio node as described herein; in particular, it may comprise corresponding circuitry, e.g. processing circuitry, and/or modules. The radio node 100 may generally comprise communication circuitry, e.g. for communication with another network node, like a radio node, and/or with a core network and/or an internet or local net, in particular with an information system, which may provide information and/or data to be transmitted to a user equipment.

Figure 9:
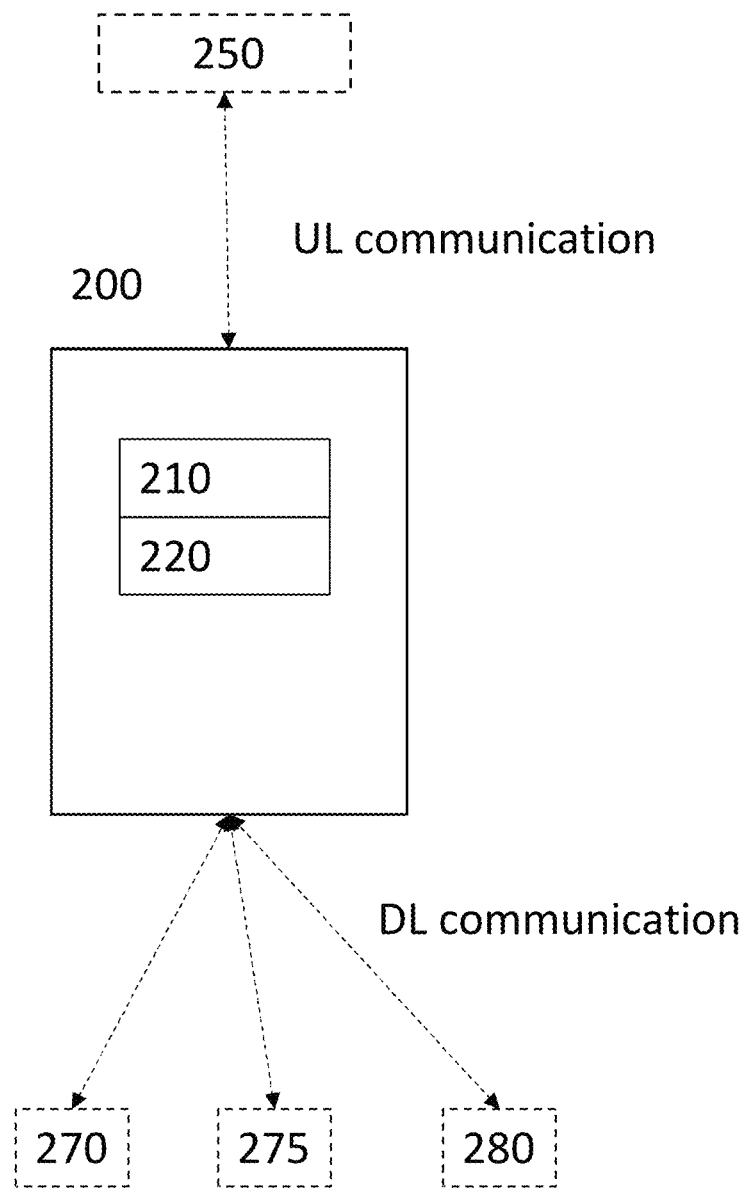
FIG. 9 showing an exemplary IAB node.

FIG. 9 shows an exemplary IAB node 200, which may be considered a form of radio node. The IAB node may in general be adapted for providing radio access to one or more terminals or UEs, and to communicate via a backhaul link with another IAB node, e.g. by providing the backhaul link, or by using it as a child node. A donor node may be considered a form of IAB node. From an IAB node's of view, UL communication may be communication via a backhaul link provided by a parent node 250, which may comprise UL and DL components itself, from and to the IAB node 200. DL communication may be communication via a backhaul link provided by the IAB node itself, or an access link provided by the IAB node, e.g. to terminals 270, 275 or IAB (child) node 280. This DL communication may also have UL and DL components, to and from the IAB node 200. The IAB node may be a radio node, which may comprise radio circuitry and/or processing circuitry and/or antenna circuitry and/or an antenna arrangement and/or other circuitry, as described of radio nodes in general. In particular, it may comprise circuitry 210 corresponding to terminal functionality 210 (also referred to as MT), and circuitry 220 corresponding to IAB control functionality (also referred to as DU). An IAB node that is a donor node may in some variants comprise circuitry corresponding to higher layer functionality, which may be also referred to as CU functionality. An IAB node may be adapted to carry out and/or control any of the methods described herein.

References to specific resource structures like transmission timing structure and/or symbol and/or slot and/or mini-slot and/or subcarrier and/or carrier may pertain to a specific numerology, which may be predefined and/or configured or configurable. A transmission timing structure may represent a time interval, which may cover one or more symbols. Some examples of a transmission timing structure are transmission time interval (TTI), subframe, slot and mini-slot. A slot may comprise a predetermined, e.g. predefined and/or configured or configurable, number of symbols, e.g. 6 or 7, or 12 or 14. A mini-slot may comprise a number of symbols (which may in particular be configurable or configured) smaller than the number of symbols of a slot, in particular 1, 2, 3 or 4 symbols. A transmission timing structure may cover a time interval of a specific length, which may be dependent on symbol time length and/or cyclic prefix used. A transmission timing structure may pertain to, and/or cover, a specific time interval in a time stream, e.g. synchronized for communication. Timing structures used and/or scheduled for transmission, e.g. slot and/or mini-slots, may be scheduled in relation to, and/or synchronized to, a timing structure provided and/or defined by other transmission timing structures. Such transmission timing structures may define a timing grid, e.g., with symbol time intervals within individual structures representing the smallest timing units. Such a timing grid may for example be defined by slots or subframes (wherein in some cases, subframes may be considered specific variants of slots). A transmission timing structure may have a duration (length in time) determined based on the durations of its symbols, possibly in addition to cyclic prefix/es used. The symbols of a transmission timing structure may have the same duration, or may in some variants have different duration. The number of symbols in a transmission timing structure may be predefined and/or configured or configurable, and/or be dependent on numerology. The timing of a mini-slot may generally be configured or configurable, in particular by the network and/or a network node. The timing may be configurable to start and/or end at any symbol of the transmission timing structure, in particular one or more slots.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement. In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channels. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths.

Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

Reference signaling may be signaling comprising one or more reference symbols and/or structures. Reference signaling may be adapted for gauging and/or estimating and/or representing transmission conditions, e.g. channel conditions and/or transmission path conditions and/or channel (or signal or transmission) quality. It may be considered that the transmission characteristics (e.g., signal strength and/or form and/or modulation and/or timing) of reference signaling are available for both transmitter and receiver of the signaling (e.g., due to being predefined and/or configured or configurable and/or being communicated). Different types of reference signaling may be considered, e.g. pertaining to uplink, downlink or sidelink, cell-specific (in particular, cell-wide, e.g., CRS) or device or user specific (addressed to a specific target or user equipment, e.g., CSI-RS), demodulation-related (e.g., DMRS) and/or signal strength related, e.g. power-related or energy-related or amplitude-related (e.g., SRS or pilot signaling) and/or phase-related, etc.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beam forming characteristics. In particular, antenna arrays may be formed by combining one or more independently or separately controllable antenna elements or subarrays. The beams may be provided by analog beamforming, or in some variants by digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) to convert digital control information into an analog antenna feed for the whole antenna arrangement (the ADC may be considered part of, and/or connected or connectable to, antenna circuitry). A scenario in which each antenna element is individually controllable may be referred to as digital beamforming, whereas a scenario in which larger arrays/subarrays are separately controllable may be considered an example of analog beamforming. Hybrid forms may be considered.

Uplink or sidelink signaling may be OFDMA (Orthogonal Frequency Division Multiple Access) or SC-FDMA (Single Carrier Frequency Division Multiple Access) signaling. Downlink signaling may in particular be OFDMA signaling. However, signaling is not limited thereto (Filter-Bank based signaling may be considered one alternative).

A radio node may generally be considered a device or node adapted for wireless and/or radio (and/or microwave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN as described herein.

The terms wireless device, user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, a RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A radio access network may be a wireless communication network, and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes.

There may be generally considered a wireless communication network or system, e.g. a RAN or RAN system, comprising at least one radio node, and/or at least one network node and at least one terminal.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Control information or a control information message or corresponding signaling (control signaling) may be transmitted on a control channel, e.g. a physical control channel, which may be a downlink channel or (or a sidelink channel in some cases, e.g. one UE scheduling another UE). For example, control information/allocation information may be signaled by a network node on PDCCH (Physical Downlink Control Channel) and/or a PDSCH (Physical Downlink Shared Channel) and/or a HARQ-specific channel. Acknowledgement signaling, e.g. as a form of control information or signaling like uplink control information/signaling, may be transmitted by a terminal on a PUCCH (Physical Uplink Control Channel) and/or PUSCH (Physical Uplink Shared Channel) and/or a HARQ-specific channel. Multiple channels may apply for multi-component/multi-carrier indication or signaling.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

An indication generally may explicitly and/or implicitly indicate the information it represents and/or indicates. Implicit indication may for example be based on position and/or resource used for transmission. Explicit indication may for example be based on a parametrisation with one or more parameters, and/or one or more index or indices, and/or one or more bit patterns representing the information. It may in particular be considered that control signaling as described herein, based on the utilised resource sequence, implicitly indicates the control signaling type.

A resource element may generally describe the smallest individually usable and/or encodable and/or decodable and/or modulatable and/or demodulatable time-frequency resource, and/or may describe a time-frequency resource covering a symbol time length in time and a subcarrier in frequency. A signal may be allocatable and/or allocated to a resource element. A subcarrier may be a subband of a carrier, e.g. as defined by a standard. A carrier may define a frequency and/or frequency band for transmission and/or reception. In some variants, a signal (jointly encoded/modulated) may cover more than one resource elements. A resource element may generally be as defined by a corresponding standard, e.g. NR or LTE. As symbol time length and/or subcarrier spacing (and/or numerology) may be different between different symbols and/or subcarriers, different resource elements may have different extension (length/width) in time and/or frequency domain, in particular resource elements pertaining to different carriers.

A resource generally may represent a time-frequency and/or code resource, on which signaling, e.g. according to a specific format, may be communicated, for example transmitted and/or received, and/or be intended for transmission and/or reception.

A border symbol may generally represent a starting symbol or an ending symbol for transmitting and/or receiving. A starting symbol may in particular be a starting symbol of uplink or sidelink signaling, for example control signaling or data signaling. Such signaling may be on a data channel or control channel, e.g. a physical channel, in particular a physical uplink shared channel (like PUSCH) or a sidelink data or shared channel, or a physical uplink control channel (like PUCCH) or a sidelink control channel. If the starting symbol is associated to control signaling (e.g., on a control channel), the control signaling may be in response to received signaling (in sidelink or downlink), e.g. representing acknowledgement signaling associated thereto, which may be HARQ or ARQ signaling. An ending symbol may represent an ending symbol (in time) of downlink or sidelink transmission or signaling, which may be intended or scheduled for the radio node or user equipment. Such downlink signaling may in particular be data signaling, e.g. on a physical downlink channel like a shared channel, e.g. a PDSCH (Physical Downlink Shared Channel). A starting symbol may be determined based on, and/or in relation to, such an ending symbol.

Configuring a radio node, in particular a terminal or user equipment, may refer to the radio node being adapted or caused or set and/or instructed to operate according to the configuration. Configuring may be done by another device, e.g., a network node (for example, a radio node of the network like a base station or eNodeB) or network, in which case it may comprise transmitting configuration data to the radio node to be configured. Such configuration data may represent the configuration to be configured and/or comprise one or more instruction pertaining to a configuration, e.g. a configuration for transmitting and/or receiving on allocated resources, in particular frequency resources. A radio node may configure itself, e.g., based on configuration data received from a network or network node. A network node may utilise, and/or be adapted to utilise, its circuitry/ies for configuring. Allocation information may be considered a form of configuration data. Configuration data may comprise and/or be represented by configuration information, and/or one or more corresponding indications and/or message/s Generally, configuring may include determining configuration data representing the configuration and providing, e.g. transmitting, it to one or more other nodes (parallel and/or sequentially), which may transmit it further to the radio node (or another node, which may be repeated until it reaches the wireless device). Alternatively, or additionally, configuring a radio node, e.g., by a network node or other device, may include receiving configuration data and/or data pertaining to configuration data, e.g., from another node like a network node, which may be a higher-level node of the network, and/or transmitting received configuration data to the radio node. Accordingly, determining a configuration and transmitting the configuration data to the radio node may be performed by different network nodes or entities, which may be able to communicate via a suitable interface, e.g., an X2 interface in the case of LTE or a corresponding interface for NR. Configuring a terminal may comprise scheduling downlink and/or uplink transmissions for the terminal, e.g. downlink data and/or downlink control signaling and/or DCI and/or uplink control or data or communication signaling, in particular acknowledgement signaling, and/or configuring resources and/or a resource pool therefor.

A resource structure may be considered to be neighbored in frequency domain by another resource structure, if they share a common border frequency, e.g. one as an upper frequency border and the other as a lower frequency border. Such a border may for example be represented by the upper end of a bandwidth assigned to a subcarrier n, which also represents the lower end of a bandwidth assigned to a subcarrier n+1. A resource structure may be considered to be neighbored in time domain by another resource structure, if they share a common border time, e.g. one as an upper (or right in the figures) border and the other as a lower (or left in the figures) border. Such a border may for example be represented by the end of the symbol time interval assigned to a symbol n, which also represents the beginning of a symbol time interval assigned to a symbol n+1.

Generally, a resource structure being neighbored by another resource structure in a domain may also be referred to as abutting and/or bordering the other resource structure in the domain.

A resource structure may general represent a structure in time and/or frequency domain, in particular representing a time interval and a frequency interval. A resource structure may comprise and/or be comprised of resource elements, and/or the time interval of a resource structure may comprise and/or be comprised of symbol time interval/s, and/or the frequency interval of a resource structure may comprise and/or be comprised of subcarrier/s. A resource element may be considered an example for a resource structure, a slot or mini-slot or a Physical Resource Block (PRB) or parts thereof may be considered others. A resource structure may be associated to a specific channel, e.g. a PUSCH or PUCCH, in particular resource structure smaller than a slot or PRB.

Examples of a resource structure in frequency domain comprise a bandwidth or band, or a bandwidth part. A bandwidth part may be a part of a bandwidth available for a radio node for communicating, e.g. due to circuitry and/or configuration and/or regulations and/or a standard. A bandwidth part may be configured or configurable to a radio node. In some variants, a bandwidth part may be the part of a bandwidth used for communicating, e.g. transmitting and/or receiving, by a radio node. The bandwidth part may be smaller than the bandwidth (which may be a device bandwidth defined by the circuitry/configuration of a device, and/or a system bandwidth, e.g. available for a RAN). It may be considered that a bandwidth part comprises one or more resource blocks or resource block groups, in particular one or more PRBs or PRB groups. A bandwidth part may pertain to, and/or comprise, one or more carriers.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising microwave and/or millimeter and/or other frequencies, in particular between 100 MHz or 1 GHz, and 100 GHz or 20 or 10 GHz. Such communication may utilise one or more carriers.

A radio node, in particular a network node or a terminal, may generally be any device adapted for transmitting and/or receiving radio and/or wireless signals and/or data, in particular communication data, in particular on at least one carrier. The at least one carrier may comprise a carrier accessed based on a LBT procedure (which may be called LBT carrier), e.g., an unlicensed carrier. It may be considered that the carrier is part of a carrier aggregate.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel may generally be a logical, transport or physical channel. A channel may comprise and/or be arranged on one or more carriers, in particular a plurality of subcarriers. A channel carrying and/or for carrying control signaling/ control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data.

In general, a symbol may represent and/or be associated to a symbol time length, which may be dependent on the carrier and/or subcarrier spacing and/or numerology of the associated carrier. Accordingly, a symbol may be considered to indicate a time interval having a symbol time length in relation to frequency domain. A symbol time length may be dependent on a carrier frequency and/or bandwidth and/or numerology and/or subcarrier spacing of, or associated to, a symbol. Accordingly, different symbols may have different symbol time lengths. In particular, numerologies with different subcarrier spacings may have different symbol time length. Generally, a symbol time length may be based on, and/or include, a guard time interval or cyclic extension, e.g. prefix or postfix.

Communication or communicating may generally comprise transmitting and/or receiving signaling. Communication on a sidelink (or sidelink signaling) may comprise utilising the sidelink for communication (respectively, for signaling). Sidelink transmission and/or transmitting on a sidelink may be considered to comprise transmission utilising the sidelink, e.g. associated resources and/or transmission formats and/or circuitry and/or the air interface. Sidelink reception and/or receiving on a sidelink may be considered to comprise reception utilising the sidelink, e.g. associated resources and/or transmission formats and/or circuitry and/or the air interface. Sidelink control information (e.g., SCI) may generally be considered to comprise control information transmitted utilising a sidelink.

Generally, carrier aggregation (CA) may refer to the concept of a radio connection and/or communication link between a wireless and/or cellular communication network and/or network node and a terminal or on a sidelink comprising a plurality of carriers for at least one direction of transmission (e.g. DL and/or UL), as well as to the aggregate of carriers. A corresponding communication link may be referred to as carrier aggregated communication link or CA communication link; carriers in a carrier aggregate may be referred to as component carriers (CC). In such a link, data may be transmitted over more than one of the carriers and/or all the carriers of the carrier aggregation (the aggregate of carriers). A carrier aggregation may comprise one (or more) dedicated control carriers and/or primary carriers (which may e.g. be referred to as primary component carrier or PCC), over which control information may be transmitted, wherein the control information may refer to the primary carrier and other carriers, which may be referred to as secondary carriers (or secondary component carrier, SCC). However, in some approaches, control information may be send over more than one carrier of an aggregate, e.g. one or more PCCs and one PCC and one or more SCCs.

A transmission may generally pertain to a specific channel and/or specific resources, in particular with a starting symbol and ending symbol in time, covering the interval therebetween. A scheduled transmission may be a transmission scheduled and/or expected and/or for which resources are scheduled or provided or reserved. However, not every scheduled transmission has to be realized. For example, a scheduled downlink transmission may not be received, or a scheduled uplink transmission may not be transmitted due to power limitations, or other influences (e.g., a channel on an unlicensed carrier being occupied). A transmission may be scheduled for a transmission timing substructure (e.g., a mini-slot, and/or covering only a part of a transmission timing structure) within a transmission timing structure like a slot. A border symbol may be indicative of a symbol in the transmission timing structure at which the transmission starts or ends.

Predefined in the context of this disclosure may refer to the related information being defined for example in a standard, and/or being available without specific configuration from a network or network node, e.g. stored in memory, for example independent of being configured. Configured or configurable may be considered to pertain to the corresponding information being set/configured, e.g. by the network or a network node.

A configuration or schedule, like a mini-slot configuration and/or structure configuration, may schedule transmissions, e.g. for the time/transmissions it is valid, and/or transmissions may be scheduled by separate signaling or separate configuration, e.g. separate RRC signaling and/or downlink control information signaling. The transmission/s scheduled may represent signaling to be transmitted by the device for which it is scheduled, or signaling to be received by the device for which it is scheduled, depending on which side of a communication the device is. It should be noted that downlink control information or specifically DCI signaling may be considered physical layer signaling, in contrast to higher layer signaling like MAC (Medium Access Control) signaling or RRC layer signaling. The higher the layer of signaling is, the less frequent/the more time/resource consuming it may be considered, at least partially due to the information contained in such signaling having to be passed on through several layers, each layer requiring processing and handling.

A scheduled transmission, and/or transmission timing structure like a mini-slot or slot, may pertain to a specific channel, in particular a physical uplink shared channel, a physical uplink control channel, or a physical downlink shared channel, e.g. PUSCH, PUCCH or PDSCH, and/or may pertain to a specific cell and/or carrier aggregation. A corresponding configuration, e.g. scheduling configuration or symbol configuration may pertain to such channel, cell and/or carrier aggregation. It may be considered that the scheduled transmission represents transmission on a physical channel, in particular a shared physical channel, for example a physical uplink shared channel or physical downlink shared channel. For such channels, semi-persistent configuring may be particularly suitable.

Generally, a configuration may be a configuration indicating timing, and/or be represented or configured with corresponding configuration data. A configuration may be embedded in, and/or comprised in, a message or configuration or corresponding data, which may indicate and/or schedule resources, in particular semi-persistently and/or semi-statically.

A control region of a transmission timing structure may be an interval in time for intended or scheduled or reserved for control signaling, in particular downlink control signaling, and/or for a specific control channel, e.g. a physical downlink control channel like PDCCH. The interval may comprise, and/or consist of, a number of symbols in time, which may be configured or configurable, e.g. by (UE-specific) dedicated signaling (which may be single-cast, for example addressed to or intended for a specific UE), e.g. on a PDCCH, or RRC signaling, or on a multicast or broadcast channel. In general, the transmission timing structure may comprise a control region covering a configurable number of symbols. It may be considered that in general the border symbol is configured to be after the control region in time.

The duration of a symbol (symbol time length or interval) of the transmission timing structure may generally be dependent on a numerology and/or carrier, wherein the numerology and/or carrier may be configurable. The numerology may be the numerology to be used for the scheduled transmission.

Scheduling a device, or for a device, and/or related transmission or signaling, may be considered comprising, or being a form of, configuring the device with resources, and/or of indicating to the device resources, e.g. to use for communicating. Scheduling may in particular pertain to a transmission timing structure, or a substructure thereof (e.g., a slot or a mini-slot, which may be considered a substructure of a slot). It may be considered that a border symbol may be identified and/or determined in relation to the transmission timing structure even if for a substructure being scheduled, e.g. if an underlying timing grid is defined based on the transmission timing structure. Signaling indicating scheduling may comprise corresponding scheduling information and/or be considered to represent or contain configuration data indicating the scheduled transmission and/or comprising scheduling information. Such configuration data or signaling may be considered a resource configuration or scheduling configuration. It should be noted that such a configuration (in particular as single message) in some cases may not be complete without other configuration data, e.g. configured with other signaling, e.g. higher layer signaling. In particular, the symbol configuration may be provided in addition to scheduling/resource configuration to identify exactly which symbols are assigned to a scheduled transmission. A scheduling (or resource) configuration may indicate transmission timing structure/s and/or resource amount (e.g., in number of symbols or length in time) for a scheduled transmission.

A scheduled transmission may be transmission scheduled, e.g. by the network or network node. Transmission may in this context may be uplink (UL) or downlink (DL) or sidelink (SL) transmission. A device, e.g. a user equipment, for which the scheduled transmission is scheduled, may accordingly be scheduled to receive (e.g., in DL or SL), or to transmit (e.g. in UL or SL) the scheduled transmission. Scheduling transmission may in particular be considered to comprise configuring a scheduled device with resource/s for this transmission, and/or informing the device that the transmission is intended and/or scheduled for some resources. A transmission may be scheduled to cover a time interval, in particular a successive number of symbols, which may form a continuous interval in time between (and including) a starting symbol and an ending symbols. The starting symbol and the ending symbol of a (e.g., scheduled) transmission may be within the same transmission timing structure, e.g. the same slot. However, in some cases, the ending symbol may be in a later transmission timing structure than the starting symbol, in particular a structure following in time. To a scheduled transmission, a duration may be associated and/or indicated, e.g. in a number of symbols or associated time intervals. In some variants, there may be different transmissions scheduled in the same transmission timing structure. A scheduled transmission may be considered to be associated to a specific channel, e.g. a shared channel like PUSCH or PDSCH.

A transmission timing structure may comprise a plurality of symbols, and/or define an interval comprising several symbols (respectively their associated time intervals). In the context of this disclosure, it should be noted that a reference to a symbol for ease of reference may be interpreted to refer to the time domain projection or time interval or time component or duration or length in time of the symbol, unless it is clear from the context that the frequency domain component also has to be considered. Examples of transmission timing structures include slot, subframe, mini-slot (which also may be considered a substructure of a slot), slot aggregation (which may comprise a plurality of slots and may be considered a superstructure of a slot), respectively their time domain component. A transmission timing structure may generally comprise a plurality of symbols defining the time domain extension (e.g., interval or length or duration) of the transmission timing structure, and arranged neighboring to each other in a numbered sequence. A timing structure (which may also be considered or implemented as synchronisation structure) may be defined by a succession of such transmission timing structures, which may for example define a timing grid with symbols representing the smallest grid structures. A transmission timing structure, and/or a border symbol or a scheduled transmission may be determined or scheduled in relation to such a timing grid. A transmission timing structure of reception may be the transmission timing structure in which the scheduling control signaling is received, e.g. in relation to the timing grid. A transmission timing structure may in particular be a slot or subframe or in some cases, a mini-slot.

Signaling may generally comprise one or more symbols and/or signals and/or messages. A signal may comprise and/or represent one or more bits, which may be modulated into a common modulated signal. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different acknowledgement signaling processes, e.g. representing and/or pertaining to one or more such processes. An indication may comprise signaling and/or a plurality of signals and/or messages and/or may be comprised therein, which may be transmitted on different carriers and/or be associated to different acknowledgement signaling processes, e.g. representing and/or pertaining to one or more such processes.

Signaling utilising, and/or on and/or associated to, resources or a resource structure may be signaling covering the resources or structure, signaling on the associated frequency/ies and/or in the associated time interval/s. It may be considered that a signaling resource structure comprises and/or encompasses one or more substructures, which may be associated to one or more different channels and/or types of signaling and/or comprise one or more holes (resource element/s not scheduled for transmissions or reception of transmissions). A resource substructure, e.g. a feedback resource structure, may generally be continuous in time and/or frequency, within the associated intervals. It may be considered that a substructure, in particular a feedback resource structure, represents a rectangle filled with one or more resource elements in time/frequency space. However, in some cases, a resource structure or substructure, in particular a frequency resource range, may represent a non-continuous pattern of resources in one or more domains, e.g. time and/or frequency. The resource elements of a substructure may be scheduled for associated signaling.

It should generally be noted that the number of bits or a bit rate associated to specific signaling that can be carried on a resource element may be based on a modulation and coding scheme (MCS). Thus, bits or a bit rate may be seen as a form of resources representing a resource structure or range in frequency and/or time, e.g. depending on MCS. The MCS may be configured or configurable, e.g. by control signaling, e.g. DCI or MAC (Medium Access Control) or RRC (Radio Resource Control) signaling.

A resource structure in frequency domain (which may be referred to as frequency interval and/or range) may be represented by a subcarrier grouping. A subcarrier grouping may comprise one or more subcarriers, each of which may represent a specific frequency interval, and/or bandwidth. The bandwidth of a subcarrier, the length of the interval in frequency domain, may be determined by the subcarrier spacing and/or numerology. The subcarriers may be arranged such that each subcarrier neighbours at least one other subcarrier of the grouping in frequency space (for grouping sizes larger than 1). The subcarriers of a grouping may be associated to the same carrier, e.g. configurably or configured of predefined. A physical resource block may be considered representative of a grouping (in frequency domain). A subcarrier grouping may be considered to be associated to a specific channel and/or type of signaling, it transmission for such channel or signaling is scheduled and/or transmitted and/or intended and/or configured for at least one, or a plurality, or all subcarriers in the grouping. Such association may be time-dependent, e.g. configured or configurable or predefined, and/or dynamic or semi-static. The association may be different for different devices, e.g. configured or configurable or predefined, and/or dynamic or semi-static. Patterns of subcarrier groupings may be considered, which may comprise one or more subcarrier groupings (which may be associated to same or different signalings/channels), and/or one or more groupings without associated signaling (e.g., as seen from a specific device). An example of a pattern is a comb, for which between pairs of groupings associated to the same signaling/channel there are arranged one or more groupings associated to one or more different channels and/or signaling types, and/or one or more groupings without associated channel/signaling).

Example types of signaling comprise signaling of a specific communication direction, in particular, uplink signaling, downlink signaling, sidelink signaling, as well as reference signaling (e.g., SRS or CRS or CSI-RS), communication signaling, control signaling, and/or signaling associated to a specific channel like PUSCH, PDSCH, PUCCH, PDCCH, PSCCH, PSSCH, etc.).

In this disclosure, for purposes of explanation and not limitation, specific details are set forth (such as particular network functions, processes and signaling steps) in order to provide a thorough understanding of the technique presented herein. It will be apparent to one skilled in the art that the present concepts and aspects may be practiced in other variants and variants that depart from these specific details.

For example, the concepts and variants are partially described in the context of Long Term Evolution (LTE) or LTE-Advanced (LTE-A) or New Radio mobile or wireless communications technologies; however, this does not rule out the use of the present concepts and aspects in connection with additional or alternative mobile communication technologies such as the Global System for Mobile Communications (GSM). While described variants may pertain to certain Technical Specifications (TSs) of the Third Generation Partnership Project (3GPP), it will be appreciated that the present approaches, concepts and aspects could also be realized in connection with different Performance Management (PM) specifications.

Moreover, those skilled in the art will appreciate that the services, functions and steps explained herein may be implemented using software functioning in conjunction with a programmed microprocessor, or using an Application Specific Integrated Circuit (ASIC), a Digital Signal Processor (DSP), a Field Programmable Gate Array (FPGA) or general purpose computer. It will also be appreciated that while the variants described herein are elucidated in the context of methods and devices, the concepts and aspects presented herein may also be embodied in a program product as well as in a system comprising control circuitry, e.g. a computer processor and a memory coupled to the processor, wherein the memory is encoded with one or more programs or program products that execute the services, functions and steps disclosed herein.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

| Abbreviation | Explanation |
| --- | --- |
| ACK/NACK | Acknowledgment/Negative Acknowledgement |
| ARQ | Automatic Repeat request |
| BER | Bit Error Rate |
| BLER | Block Error Rate |
| CAZAC | Constant Amplitude Zero Cross Correlation |
| CBG | Code Block Group |
| CDM | Code Division Multiplex |
| CM | Cubic Metric |
| CQI | Channel Quality Information |
| CRC | Cyclic Redundancy Check |
| CRS | Common reference signal |
| CSI | Channel State Information |
| CSI-RS | Channel state information reference signal |
| DAI | Downlink Assignment Indicator |
| DCI | Downlink Control Information |
| DFT | Discrete Fourier Transform |
| DM(-)RS | Demodulation reference signal(ing) |
| FDM | Frequency Division Multiplex |
| HARQ | Hybrid Automatic Repeat Request |
| IFFT | Inverse Fast Fourier Transform |
| MBB | Mobile Broadband |
| MCS | Modulation and Coding Scheme |
| MIMO | Multiple-input-multiple-output |
| MRC | Maximum-ratio combining |
| MRT | Maximum-ratio transmission |
| MU-MIMO | Multiuser multiple-input-multiple-output |
| OFDM/A | Orthogonal Frequency Division Multiplex/Multiple Access |
| PAPR | Peak to Average Power Ratio |
| PDCCH | Physical Downlink Control Channel |
| PDSCH | Physical Downlink Shared Channel |
| PRACH | Physical Random Access CHannel |
| PRB | Physical Resource Block |
| PUCCH | Physical Uplink Control Channel |
| PUSCH | Physical Uplink Shared Channel |
| (P)SCCH | (Physical) Sidelink Control Channel |
| (P)SSCH | (Physical) Sidelink Shared Channel |
| RB | Resource Block |
| RRC | Radio Resource Control |
| SC-FDM/A | Single Carrier Frequency Division Multiplex/Multiple Access |
| SCI | Sidelink Control Information |
| SINR | Signal-to-interference-plus-noise ratio |
| SIR | Signal-to-interference ratio |
| SNR | Signal-to-noise-ratio |
| SR | Scheduling Request |
| SRS | Sounding Reference Signal(ing) |
| SVD | Singular-value decomposition |
| TDM | Time Division Multiplex |
| UCI | Uplink Control Information |

| Abbreviation | Explanation |
|---|---|
| UE | User Equipment |
| URLLC | Ultra Low Latency High Reliability Communication |
| VL-MIMO | Very-large multiple-input-multiple-output |
| ZF | Zero Forcing |

Abbreviations may be considered to follow 3GPP usage if applicable.

The invention claimed is:

1. A method of operating an Integrated Access and Backhaul (IAB) node in a radio access network, the IAB node being connected to a first parent IAB node via a first backhaul link having a first timing, and being connected to a second parent IAB node via a second backhaul link having a second timing, the method comprising:
providing a communication link for access or backhaul, the communication link having a communication timing based on the first timing and the second timing.

2. The method of claim 1, wherein the method comprises basing the timing of transmission by the IAB node on the communication link on the communication timing.

3. The method of claim 1, wherein method comprises basing the timing of reception by the IAB node on the communication link on the communication timing.

4. The method of claim 1, wherein the method comprises basing the communication timing on a function of the first timing and the second timing.

5. The method of claim 1, wherein the first timing is based on control signaling indicating timing and/or synchronization received from the first parent node, for the first backhaul link, and/or the second timing is based on control signaling indicating timing and/or synchronization received from the second parent node, for the second backhaul link.

6. The method of claim 1, wherein the method comprises basing the communication timing on a timing synchronized relative to a donor node.

7. The method of claim 1, wherein the method comprises basing the communication timing on a weighted sum of the first timing and the second timing.

8. The method of claim 1, wherein the method comprises basing the communication timing on received power and/or signal quality.

9. The method of claim 1, wherein the IAB node is connected, or adapted to be connected or connectable, to a plurality of parent nodes via associated backhaul links with corresponding timings.

10. The method of claim 1, wherein the method comprises basing the communication timing on the number of parent nodes of the IAB node, and/or hop-count of a parent.

11. The method of claim 1, wherein the method comprises basing the communication timing on link latency and/or propagation delay.

12. The method of claim 1, wherein the method comprises basing the communication timing on historical information and/or numerology.

13. A network node for a radio access network, the network node being an Integrated Access and Backhaul (IAB) node, the network node comprising:
radio circuitry;
processing circuitry operatively coupled to the radio circuitry, wherein the processing circuitry is configured to:
connect the network node to a first parent IAB node via a first backhaul link having a first timing;
connect the network node to a second parent IAB node via a second backhaul link having a second timing; and
provide a communication link for access or backhaul, the communication link having a communication timing based on the first timing and the second timing.

14. A non-transitory computer-readable medium comprising, stored thereupon, computer program instructions configured for execution by a network node being an Integrated Access and Backhaul (IAB) node, the computer program instructions being configured to cause the network node to:
connect the network node to a first parent IAB node via a first backhaul link having a first timing;
connect the network node to a second parent IAB node via a second backhaul link having a second timing; and
provide a communication link for access or backhaul, the communication link having a communication timing based on the first timing and the second timing.

\* \* \* \* \*